J. R. WEATHERLY.
STALK CUTTER.
APPLICATION FILED APR. 2, 1913.

1,095,252.

Patented May 5, 1914.

2 SHEETS—SHEET 1.

Witnesses
A. A. Hammond
Lloyd W. Patch

Inventor
John R. Weatherly
By Louis Bagley
His Attorneys

J. R. WEATHERLY.
STALK CUTTER.
APPLICATION FILED APR. 2, 1913.
1,095,252.
Patented May 5, 1914.
2 SHEETS—SHEET 2.
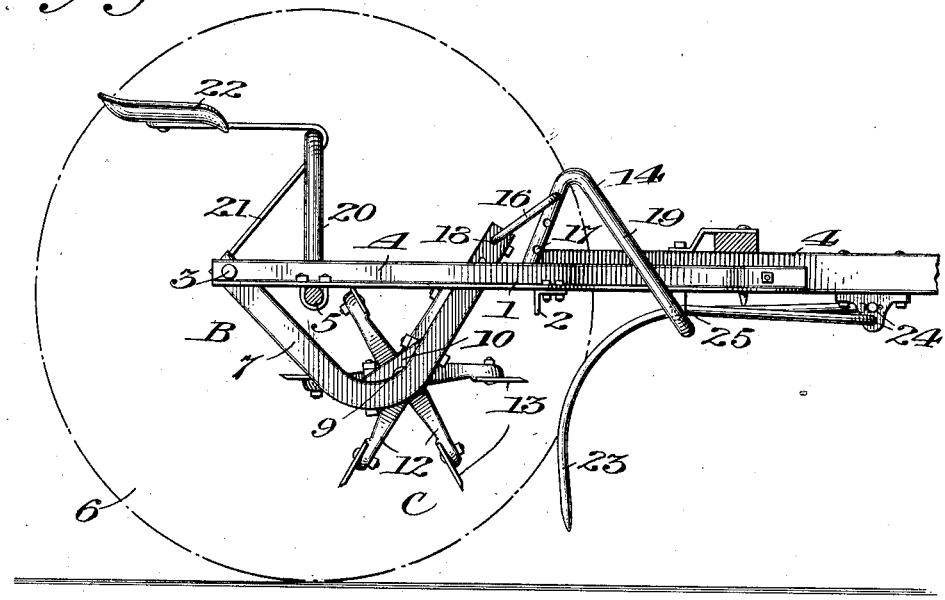

UNITED STATES PATENT OFFICE.

JOHN R. WEATHERLY, OF CHARLESTON, SOUTH CAROLINA.

STALK-CUTTER.

1,095,252.　　　　　Specification of Letters Patent.　　Patented May 5, 1914.

Application filed April 2, 1913. Serial No. 758,359.

*To all whom it may concern:*

Be it known that I, JOHN R. WEATHERLY, a citizen of the United States, residing at Charleston, in the county of Charleston and State of South Carolina, have invented certain new and useful Improvements in Stalk-Cutters, of which the following is a specification.

My invention relates to an improvement in stalk cutters, and has reference to that type of stalk cutter disclosed in my former Patents, #796,884, dated August 8, 1905, and #976,959, dated November 29, 1910, and also patent to A. W. Weatherly, 799,506, dated September 12, 1905.

The object of the present invention is to provide a structure comprising a minimum number of parts, which is more simple in construction and less expensive to manufacture, and at the same time is more efficient in its operation by reason of the fact that the blades bear evenly upon the stalks throughout their length, thereby producing less strain upon the superstructure of the cutter.

With the foregoing objects in view, my invention consists in certain novel features of construction and combinations of parts which will be hereinafter described and pointed out in the claim.

Figure 1:
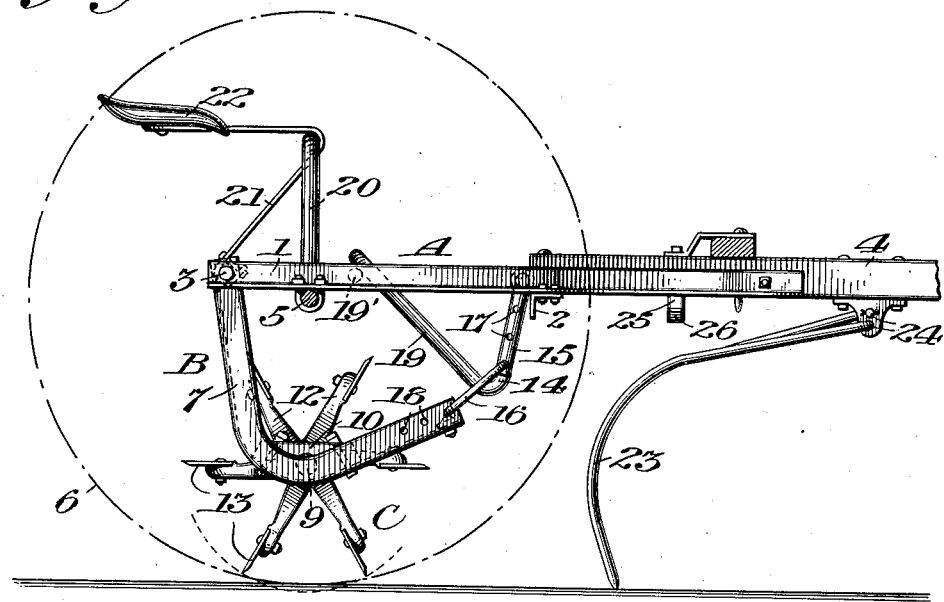
Figure 2:
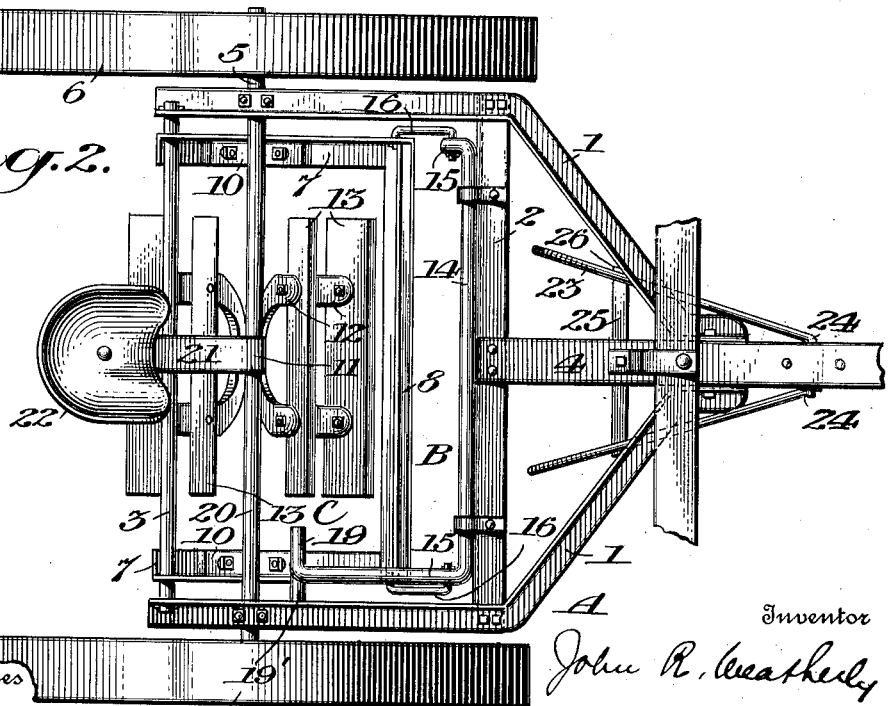

In the accompanying drawings: Figure 1 is a view in side elevation with the near wheel removed; Fig. 2 is a top plan view of Fig. 1; Fig. 3 is a view in side elevation with parts in section, showing the relative positions of the parts when the cutter is raised out of operative position; Fig. 4 is a perspective view of the lever for raising and lowering the cutter; and Fig. 5 is a fragmentary view partly in section of the cutter.

A represents the frame, the sides 1, 1, of which are preferably formed of angle iron, and the sides are connected together in the front by the angle iron 2, and in the rear by the bar 3. A tongue 4 is fastened at its rear end to the angle iron 2, and the forward ends of the sides 1, 1, are secured to the tongue forwardly of its rear end. An axle 5 is secured to the frame A, and wheels 6, 6, are mounted on each end of the axle.

The cutter frame B is pivotally mounted on the bar 3, and this frame is composed of sides 7, 7, which are bent substantially in the form of an L. The bar 8 connects the sides 7, 7, of the cutter frame, at their forward end, and they are pivoted at their rear end to the bar 3.

A shaft 9 is journaled in the bearings 10, 10, carried by the cutter frame, and the cutter C is secured approximately at the center of the shaft. This cutter C is of virtually the same construction as those disclosed in the patents referred to, and is designed to perform the same function with greater efficiency. The cutter is composed of a hub 11, having bifurcated arms 12, 12, extending radially therefrom, and at the outer ends of the arms 12, the blades 13, 13 are removably secured. I have found that in the use of a cutter of the form shown in my former patents, there is a tendency of the blades to bear unevenly upon the stalks, and I have therefore provided the bifurcated arms 12, to form a support near each end of the cutter blades.

A U-shaped lever 14 is pivotally connected to the angle iron 2, in such a manner that an end 15 of the U is at each side of the cutter frame. Links 16, 16, are pivotally connected to the ends 15 of the lever, and to the cutter frame B, and these links are adjustable through a plurality of openings 17 and 18, in the lever and cutter frame, respectively. One end 15 of the lever 14 is made longer than the other, and is bent rearwardly approximately at right angles to the portion 15, thereby forming a foot lever 19, which is held in its lowered position by its engagement with a stop 19' on the frame A, and in its raised position is supported by the angle iron 2 of the frame. In either the raised or lowered position, the pivotal connection between the ends 15 of the lever 14 and the links 16, would travel past the dead center, and would thus form a positive lock for holding the cutter frame B rigid.

The middle portion 20 of the axle 5 is bowed up to form a greater clearance for the cutter C when it is in its raised position, and the axle is held in place by a spring 21 which carries the seat 22.

Spring teeth 23, 23 are pivotally supported as at 24, 24, to the under side of the tongue 4, and their function is to drag along the ground, being held down by gravity, and to straighten the plants and force them inwardly into the path of the cutter blades. A plate 25 is secured to the under side of the tongue, and is provided at its extremities with hooks 26, 26, which are adapted to hold the spring teeth 23 raised, when the device is not in operation.

From the foregoing, it will be seen that I have provided a stalk cutter which has a minimum number of parts, and one which overcomes the wabbling from side to side, which is an objection in the structures disclosed in my former patents, by reason of the cutter frame being held equally rigid at each side through its connection with the lever ends 15, 15 and the links 16, 16. It will also be seen that when the device is adjusted to either the operative or inoperative position, the cutter frame is automatically locked by reason of the lever 14 passing the dead center when the device has assumed the operative or inoperative position, as clearly disclosed in Figs. 1 and 3.

Having fully described my invention, what I claim as new and desire to secure by Letters Patent is:—

In a stalk-cutter, the combination with a main-frame, cutter-frame, means for pivotally connecting the two together, and a cross-bar connecting the sides of the main frame, of a U-shaped lever supported by and pivotally connected to said cross-bar, said lever having two ends, links extending from the free end of the cutter-frame to said ends, and a foot-lever extension extending from one of the ends in position to be operated by the driver's foot to raise or lower the cutter-frame, the foot-lever extending at an angle to the end of the U-shaped lever, positive stops in position to be engaged by the foot-lever when the ends of the lever shall have passed the dead center in moving the cutter-frame to either of its adjusted positions whereby to retain and lock the frame in that position, and the relation of the ends and links being such that in either extreme position of the foot-lever they have crossed dead center.

In testimony whereof I affix my signature, in the presence of two witnesses.

JOHN R. WEATHERLY.

Witnesses:
J. MONSERRAT,
V. T. PRICE.

---

Copies of this patent may be obtained for five cents each, by addressing the "Commissioner of Patents, Washington, D. C."